US010846522B2

United States Patent
Chaudhuri et al.

(10) Patent No.: US 10,846,522 B2
(45) Date of Patent: Nov. 24, 2020

(54) SPEAKING CLASSIFICATION USING AUDIO-VISUAL DATA

(71) Applicant: Google LLC, Mountain View, CA (US)

(72) Inventors: Sourish Chaudhuri, San Francisco, CA (US); Ondrej Klejch, Mountain View, CA (US); Joseph Edward Roth, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 16/161,927

(22) Filed: Oct. 16, 2018

(65) Prior Publication Data
US 2020/0117887 A1    Apr. 16, 2020

(51) Int. Cl.

| G06K 9/00 | (2006.01) |
|---|---|
| G06N 3/04 | (2006.01) |
| G06N 3/08 | (2006.01) |
| G06N 5/04 | (2006.01) |
| G10L 15/24 | (2013.01) |
| G10L 25/24 | (2013.01) |

(52) U.S. Cl.
CPC ..... *G06K 9/00335* (2013.01); *G06K 9/00744* (2013.01); *G06N 3/04* (2013.01); *G06N 3/08* (2013.01); *G06N 5/046* (2013.01); *G10L 15/24* (2013.01); *G10L 25/24* (2013.01)

(58) Field of Classification Search
USPC ......................................... 382/155–156, 159
See application file for complete search history.

(56) References Cited

U.S. PATENT DOCUMENTS

| 6,567,775 | B1 * | 5/2003 | Maali ................... G06K 9/6293 704/231 |
|---|---|---|---|
| 9,159,321 | B2 * | 10/2015 | Cheung .............. G06K 9/00335 |
| 2004/0267521 | A1 * | 12/2004 | Cutler ..................... G10L 25/78 704/202 |
| 2015/0058004 | A1 * | 2/2015 | Dimitriadis ............. G10L 25/84 704/233 |
| 2016/0314789 | A1 * | 10/2016 | Marcheret ............... G10L 15/25 |
| 2017/0061966 | A1 * | 3/2017 | Marcheret .......... G06K 9/00718 |
| 2018/0018970 | A1 * | 1/2018 | Heyl ....................... G10L 17/18 |

(Continued)

OTHER PUBLICATIONS

Chakravarty et al, "Active speaker detection with audio-visual co-training" Multimodal Interaction, Oct. 2016, 5 pages.

(Continued)

*Primary Examiner* — Ishrat I Sherali
(74) *Attorney, Agent, or Firm* — Fish & Richardson P.C.

(57) ABSTRACT

Methods, systems, and apparatus, including computer programs encoded on a computer storage medium, for generating predictions for whether a target person is speaking during a portion of a video. In one aspect, a method includes obtaining one or more images which each depict a mouth of a given person at a respective time point. The images are processed using an image embedding neural network to generate a latent representation of the images. Audio data corresponding to the images is processed using an audio embedding neural network to generate a latent representation of the audio data. The latent representation of the images and the latent representation of the audio data is processed using a recurrent neural network to generate a prediction for whether the given person is speaking.

20 Claims, 4 Drawing Sheets

(56) References Cited

U.S. PATENT DOCUMENTS

2019/0005976 A1* 1/2019 Peleg .................... G10L 25/18
2019/0043525 A1* 2/2019 Huang ................... G10L 25/51

OTHER PUBLICATIONS

Ephrat et al, "Looking to Listen at the Cocktail Party: A Speaker-Independent Audio-Visual Model for Speech Separation", arXiv, Apr. 2018, 11 pages.
PCT International Search Report and Written Opinion in International Application No. PCT/US2019/054445, dated Jan. 28, 2020, 14 pages.
Rother et al, "AVA-ActiveSpeaker: An Audio-Visual Dataset for Active Speaker Detection", arXiv, Jan. 2019, 15 pages.
Bredin et al. "Audiovisual Speech Synchrony Measure: Application to Biometrics," Journal on Advances in Signal Processing, vol. 2007, Article ID 70186, 11 pages.
Chung et al. "Lip Reading in Profile," Visual Geometry Group, Department of Engineering Science, University of Oxford, copyright 2017 [retrieved on Oct. 17, 2018] Retrieved from Internet: URL<https://www.robots.ox.ac.uk/~vgg/publications/2017/Chung17a/chung17a.pdf> 11 pages.
Chung et al. "Out of time: Automated lip sync in the wild," Asian Conference on Computer Vision, Nov. 2016, 14 pages.
Hoover et al. "Putting a Face to the Voice: Fusing Audio and Visual Signals Across a Video to Determine Speakers," arXiv1706.00079v1, May 31, 2017, 5 pages.
Owens et al. "Audio-Visual Scene Analysis with Self-Supervised Multisensory Features," arXiv1804.03641v2, Oct. 9, 2018, 19 pages.
Sargin et al. "Audiovisual Synchronization and Fusion Using Canonical Correlation Analysis," Transactions on Multimedia 9(7), Nov. 2007, 8 pages.

\* cited by examiner

SPEAKING CLASSIFICATION USING AUDIO-VISUAL DATA

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates predictions for whether a target person is speaking during a portion of a video.

According to a first aspect there is provided a method including obtaining one or more images which each depict a mouth of a given person at a respective time point, where each of the respective time points are different. The one or more images are processed using an image embedding neural network to generate a latent representation of the one or more images. Audio data corresponding to the one or more images is obtained. A representation of the audio data is processed using an audio embedding neural network to generate a latent representation of the audio data. The latent representation of the one or more images and the latent representation of the audio data are processed using a recurrent neural network to generate an output defining a prediction for whether the given person is speaking at one or more of the respective time points. The image embedding neural network, the audio embedding neural network, and the recurrent neural network are trained by an end-to-end optimization procedure.

In some implementations, obtaining one or more images which each depict a mouth of a given person at a respective time point includes obtaining one or more video frames from a video, where each of the video frames depict the given person. A respective location of the given person in each of the one or more video frames is determined. For each of the one or more video frames, a respective portion of the video frame which depicts the mouth of the given person is cropped based on location of the given person in the video frame.

In some implementations, the audio data corresponds to the one or more video frames of the video.

In some implementations, each of the one or more images depict a face or body of the given person in addition to the mouth of the given person.

In some implementations, the representation of the audio data includes mel-frequency cepstral coefficients of the audio data.

In some implementations, the latent representation of the one or more images and the latent representation of the audio data are processed to update a current internal state of the recurrent neural network to generate a new internal state of the recurrent neural network. The new internal state of the recurrent neural network is processed to generate the output defining the prediction for whether the given person is speaking at one or more of the respective time points.

In some implementations, the image embedding neural network and the audio embedding neural network each include one or more convolutional neural network layers.

In some implementations, the recurrent neural network includes multiple gated recurrent units (GRUs).

According to a second aspect there is provided a system including: (i) a data processing apparatus, and (ii) a memory in data communication with the data processing apparatus and storing instructions that cause the data processing apparatus to perform the operations of the method described above.

According to a third aspect there is provided one or more non-transitory computer storage media storing instructions that when executed by one or more computers cause the one or more computers to perform the operations of the method described above.

Particular embodiments of the subject matter described in this specification can be implemented so as to realize one or more of the following advantages.

The speaking classification system described in this specification integrates both audio and visual data to determine whether a target person is speaking during a portion of a video. By integrating both audio and visual data, the system learns to distinguish complex correlations between the positions and movement of the mouth of the target person (and, optionally, the whole face or whole body of the target person) and the corresponding audio data to accurately predict whether the target person is speaking. Compared to a system that performs speaking classification using only visual data, the system described in this specification can achieve an increase in speaking classification accuracy. Moreover, by integrating audio and visual data, the system described in this specification can reduce computational resource consumption (e.g., memory and computing power) compared to systems that use only visual data. In a particular example, by processing 1 video frame and a constant amount of audio data, the system described in this specification can outperform a system which processes 3 video frames (and no audio data). Since processing 1 video frame and the constant amount of audio data consumes fewer computational resources than processing 3 video frames, in this example, the system described in this specification reduces computational resource consumption by processing both audio and visual data.

The speaking classification system described in this specification can process images which depict not only the mouth of the target person, but potentially the entire face or even the whole body of the target person. In this manner, the system can learn to distinguish correlations between the positions and movement of the face and body of the target person and the audio data to accurately predict whether the target person is speaking. By processing images which depict more than just the mouth of the target person, the system described in this specification can learn to recognize signals from the face or body of the target person that are useful in generating speaking classification predictions and can therefore achieve a higher prediction accuracy. Example signals from the face or body of the target person include changes in expression, eye movement, arm gestures, and the like. Recognizing signals from the face or body of the target person may particularly increase speaking classification prediction accuracy when the mouth of the target person is occluded (e.g., due to the target person looking away from the camera). Moreover, the system described in this specification directly processes images of the target person without (as in some conventional systems) preprocessing them, e.g., to identify facial landmarks, thereby reducing computational resource consumption. This is a technical improvement in the field of visual and audio processing.

The system described in this specification can use a recurrent neural network to generate sequences of respective speaking classification predictions for whether a target person is speaking during respective portions of a video. By using a recurrent neural network, the system can use its "memory" of previously processed portions of the video to generate a more accurate speaking classification prediction for the portion of the video currently being processed. Specifically, the system can avoid generating "noisy" speaking classification predictions which rapidly transition between "speaking" and "not speaking" predictions for the target person (e.g., over periods of 0.1 seconds or less). This is yet another technical improvement in the field of visual and audio processing.

The system described in this specification is trained by an end-to-end optimization procedure. More specifically, the neural networks included in the system are jointly trained by backpropagating gradients of a loss function through a fusion neural network and into an audio embedding neural network and an image embedding neural network. Jointly training the neural networks included in the system by an end-to-end optimization procedure enables the system to generate more accurate speaking classification predictions than if the neural networks included in the system were trained separately. In particular, joint training can allow the neural networks to learn correlations between audio data and image data that would not be learned by training the neural networks separately, thereby improving the accuracy of the system. This is yet another technical improvement in the field of visual and audio processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a speaking classification system that processes one or more video frames and a segment of audio data from a portion of a video to generate a prediction for whether a target person (i.e., who is depicted in the video frames) is speaking during the portion of the video. The system processes the audio data using an audio embedding neural network to generate a latent representation of the audio data. The system may, optionally, crop images depicting (at least) the mouth of the target person from the video frames and process the cropped images using an image embedding neural network to generate a latent representation of the cropped images. The system processes the latent representation of the audio data and the latent representation of the cropped images depicting the mouth of the target person using a fusion neural network to generate the prediction for whether the target person is speaking during the portion of the video. These features and other features are described in more detail below.

Figure 1:
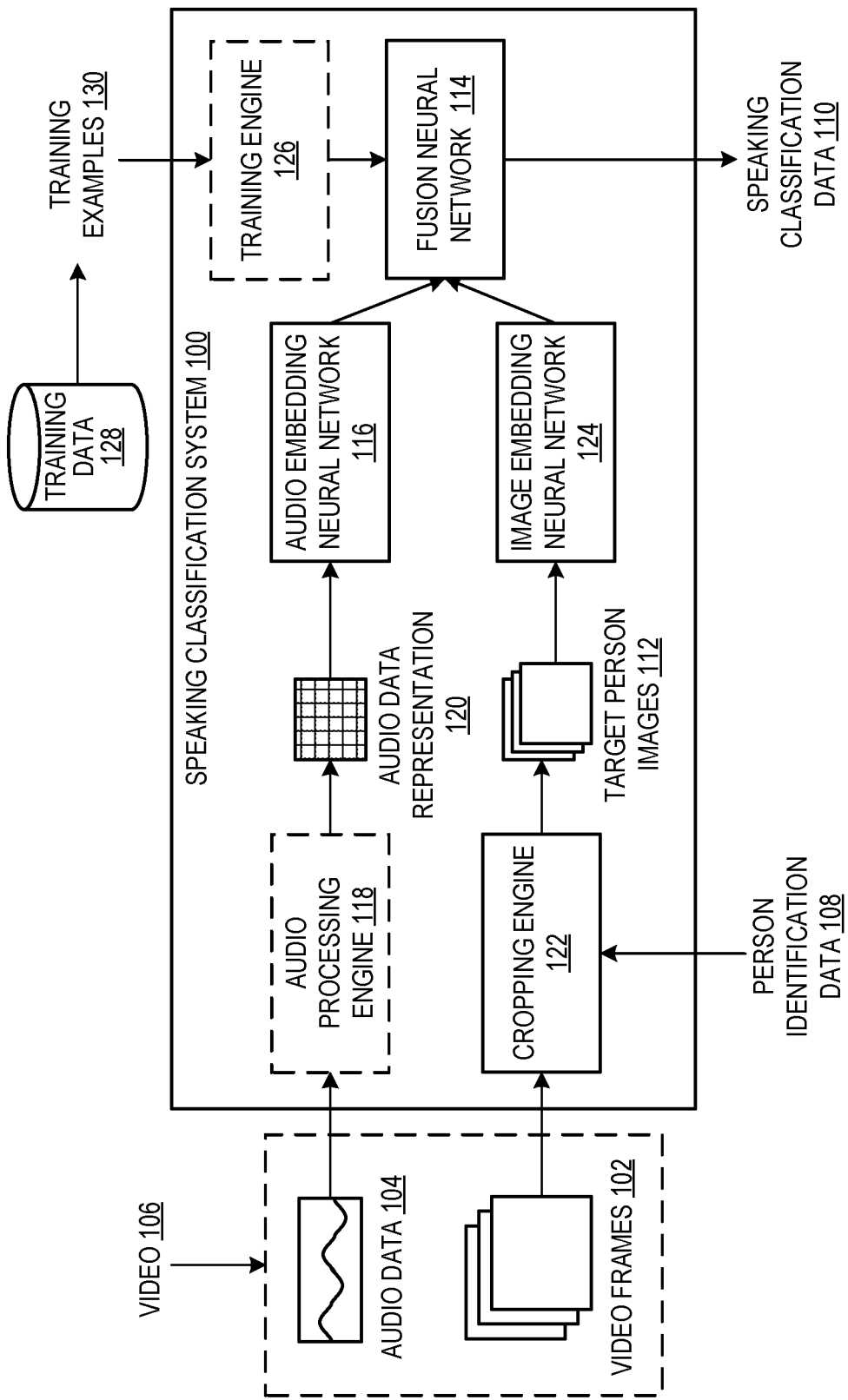
FIG. 1 shows an example speaking classification system.

FIG. 1 shows an example speaking classification system 100. The speaking classification system 100 is an example of a system implemented as computer programs on one or more computers in one or more locations in which the systems, components, and techniques described below are implemented.

The speaking classification system 100 is configured to process one or more video frames 102 and corresponding audio data 104 from a video 106. Generally, the video frames 102 and the corresponding audio data 104 represent only a fraction of the video 106. For example, the video 106 may include thousands of video frames with corresponding audio data, while the system 100 may be configured to process only 3 video frames 102, and audio data 104 corresponding to the 3 video frames, at a time. The audio data 104 may correspond to exactly the same portion of the video as the video frames 102, but can in some cases correspond to a larger or smaller portion of the video 106 than the video frames 102. The audio data 104 from the video 106 can be a recording (e.g., captured by a microphone) at the same time and place where the video frames 102 are captured. In particular, the audio data 104 may be a recording of words spoken by one or more people depicted in the video frames 102 when the video frames 102 are captured.

The system 100 processes the input audio data 104, video frames 102, and person identification data 108 which specifies a person depicted in the video frames 102 (referred to herein as the "target person"), to generate speaking classification data 110. The speaking classification data 110 defines a prediction (e.g., a probability) for whether the target person is speaking during the portion of the video 106 characterized by the video frames 102 and the corresponding audio data 104.

As illustrated with reference to FIG. 2, the system 100 can be used to sequentially process audio data 104 and video frames 102 representing (potentially overlapping) portions of the video 106 to generate a sequence of speaking classification data 110 outputs. The sequence of speaking classification data 110 outputs can define predictions for whether the target person is speaking during multiple respective portions of the video 106.

The system 100 includes an audio embedding neural network 116, an image embedding neural 124 and a fusion neural network 114. As is known to those skilled in the art, an embedding neural network is a type of artificial neural network that is configured to map a discrete input (e.g. a feature vector) to a continuously-valued output (e.g. a vector or matrix). In contrast to other types of neural network with "one-hot" outputs, the continuously-valued outputs of an embedding neural network have the property that similar inputs are mapped to outputs that are close to one another in multi-dimensional space. The output of an embedding neural network can thus be described as a latent representation of the data that is input to the embedding neural network. The audio embedding neural network 116 and the image embedding neural network 124 are embedding neural networks that are configured to process audio and image inputs, respectively, and are described in more detail below.

The fusion neural network 114 is configured to combine the outputs of the audio embedding neural network 116 and the image embedding neural network 124. The inputs to fusion neural network 114 are the outputs of the audio embedding neural network 116 and the image embedding neural network 124. The output of the fusion neural network 114 defines a prediction of whether the target person is speaking during the portion of the video 106. The term "prediction" refers to a determination, made by the fusion neural network 114, of whether the target person is speaking during a portion of the video 106. The prediction may be expressed as a probability of whether the target person is speaking, which may take the form of a floating point value between 0.0 and 1.0. Alternatively or additionally, the prediction may be expressed as a binary value (i.e., "true" or "false"), which indicates whether or not the target person has been determined to be speaking.

As described in more detail below, the fusion neural network 114 may be implemented using a recurrent neural network. As is known to those skilled in the art, a recurrent neural network is a type of artificial neural network having an internal state (or memory), such that the output of the recurrent neural network is a function of its input(s) and its internal state. The internal state of the recurrent neural network is iteratively updated, to generate a new internal state as a function of the current internal state and the current input(s). The current internal state of the recurrent neural network is, in turn, a function of previous input(s) and the previous internal state. A recurrent neural network allows an accurate prediction of whether the target person is speaking in a particular frame of the video 106. This is because the probability of whether the target person is speaking in any given frame is influenced by whether that person was, or was not, speaking in the preceding frame or frames. The internal state of the recurrent neural network thus allows predictions for preceding frames to be taken into account when determining the prediction for the current frame, thereby improving the overall accuracy of prediction.

The audio data 104 and the video frames 102 processed by the speaking classification system 100 can be represented in any appropriate numerical format. For example, the audio data 104 can be represented as an audio waveform which is embodied as a vector of numerical amplitude values. As another example, each of the video frames 102 may be represented as a multi-dimensional matrix of numerical values. In a particular example, each of the video frames may be represented as respective red-green-blue (RGB) images which are each embodied by a respective three-dimensional (3D) matrix of numerical values.

To generate the speaking classification data 110, the system 100 generates a latent representation of the audio data 104 and a latent representation of target person images 112 which are cropped from the video frames 102 and which depict the mouth of the target person. Subsequently, the system 100 provides the respective latent representations of the audio data 104 and the target person images 112 to a fusion neural network 114. The fusion neural network 114 is configured to process the respective latent representations of the audio data 104 and the target person images 112 to generate the speaking classification data 110, as will be described in more detail below.

In this specification, a latent representation of a set of data (e.g., of the audio data 104 or the target person images 112) refers to a numerical representation of the data (e.g., as a vector or matrix) which is generated internally by the system 100. For example, the system 100 can generate a latent representation of a set of data by processing the data using a neural network and determining the output of the neural network to be the latent representation of the data.

To generate the latent representation of the audio data 104, the system 100 processes the audio data 104 using an audio embedding neural network 116 in accordance with current values of audio embedding neural network parameters. The system 100 determines the output of the final layer of the audio embedding neural network 116 to be the latent representation of the audio data 104. Optionally, prior to providing the audio data 104 to the audio embedding neural network 116, the system 100 can process the audio data 104 using an audio processing engine 118 to generate an alternative representation 120 of the audio data. For example, the audio processing engine 118 may process a one-dimensional representation of the audio data 104 as an audio waveform to generate an alternative representation 120 of the audio data as a two-dimensional array of mel-frequency cepstral coefficients (MFCCs), or as a mel-spectrogram. After generating the alternative representation 120 of the audio data 104, the system 100 can generate the latent representation of the audio data 104 by processing the alternative representation 120 of the audio data 104 using the audio embedding neural network 116.

Generally, the audio embedding neural network 116 can be implemented with any appropriate neural network architecture. For example, if the audio embedding neural network 116 is configured to directly process a representation of the audio data 104 as a 1D audio waveform, then the architecture of the audio embedding neural network may include one or more 1D convolutional layers. A 1D convolutional layer refers to a convolutional layer defined by 1D convolutional filters. As another example, if the audio embedding neural network 116 is configured to process a representation of the audio data 104 as a 2D array of mel-frequency cepstral coefficients, then the architecture of the audio embedding neural network 116 may include one or more 2D convolutional layers. A 2D convolutional layer refers to a convolutional layer defined by 2D convolutional filters. In some cases, the final layer of the audio embedding neural network 116 is a fully-connected layer, and the system 100 may determine the latent representation of the audio data 104 to be a 1D vector output by this fully-connected layer.

The system 100 generates the target person images 112 by processing each of the video frames 102 and the person identification data 108 using a cropping engine 122. The cropping engine 122 is configured to determine the position (i.e. the location) of the target person identified by the person identification data 108 in each video frame 102, and crop a portion of each video frame 102 which depicts the mouth of the target person to generate the respective target person images 112. In some cases, the cropping engine 122 is configured to crop a portion of each video frame 102 which depicts more than just the mouth of the target person. For example, the cropping engine 122 may be configured to crop a portion of each video frame 102 which depicts a region of the face of the target person which includes the mouth, the whole face of the target person, or even the whole body of the target person.

The person identification data 108 which identifies the target person can be represented in any appropriate format. For example, the person identification data 108 can be a latent representation of the face of the target person generated using a face embedding neural network (e.g., a FaceNet neural network). As another example, the person identification data 108 may be data indicating the position of the face of the target person in a previous video frame (e.g., by a bounding box around the face of the target person in the previous video frame). In this example, to determine the position of the target person in the video frames 102, the cropping engine 122 can use a face detection neural network to detect the positions (e.g., represented by bounding boxes) of each face in the video frames 102. Subsequently, the cropping engine 122 can determine the position of the target person in a video frame 102 as the detected face which is "closest" (e.g., as measured by bounding box overlap) with the known position of the face of the target person in the previous video frame. An example process by which the cropping engine 122 can determine the position of the target person in each video frame 102 using the person identification data 108 is described with reference to FIG. 3.

The system 100 can generate the latent representation of the target person images 112 by concatenating the target person images 112 and processing them using an image embedding neural network 124 in accordance with current values of image embedding neural network parameters. The system can determine the output of the final layer of the image embedding neural network 124 to be the latent representation of the target person images 112.

Generally, the image embedding neural network 124 can be implemented with any appropriate neural network architecture. For example, the architecture of the image embedding neural network may include one or more 2D or 3D convolutional layers (i.e., convolutional layers defined by 2D or 3D convolutional filters). In some cases, the final layer of the image embedding neural network 124 is a fully-connected layer, and the system 100 may determine the latent representation of the target person images 112 to be a 1D vector output by this fully-connected layer.

The system 100 concatenates the latent representation of the audio data 104 and the latent representation of the target person images 112, and provides the concatenated latent representations to the fusion neural network 114. The fusion neural network 114 processes the respective latent representations in accordance with current values of fusion neural network parameters to generate the corresponding speaking classification data 110. The speaking classification data 110 defines a prediction (e.g., a numerical probability value between 0 and 1) for whether the target person is speaking during the duration of the video characterized by the video frames 102 and the corresponding audio data 104. Intuitively, the fusion neural network 114 can be understood to learn to distinguish complex correlations between different positions and movements of the mouth of the target person and variations in the corresponding audio data 104. When the target person images 112 depict more than just the mouth of the target person (e.g., they depict the face or the whole body), the fusion neural network 114 can further learn to distinguish complex correlations involving the positions and movements of the face and body of the target person.

Generally, the fusion neural network 114 can be implemented with any appropriate neural network architecture. For example, the fusion neural network 114 can include one or more convolutional neural network layers, one or more fully-connected neural network layers, or both.

In some implementations, the fusion neural network 114 is implemented as a recurrent neural network. For example, the fusion neural network 114 may be implemented as a gated recurrent unit (GRU), or a stack of multiple GRUs. In these implementations, the fusion neural network 114 maintains an internal state that can be understood as summarizing audio data and target person images from preceding portions of the video 106 which were already processed by the system 100. The fusion neural network 114 uses the maintained internal state in generating the speaking classification data 110 for the audio data 104 and the target person images 112 currently being processed by the system 100. Therefore, when the fusion neural network 114 is implemented as a recurrent neural network, the fusion neural network 114 can use its "memory" of video frames and audio data from previously processed portions of the video 106 to generate more accurate speaking classification data 110. In this manner, the fusion neural network 114 can generate a sequence of speaking classification data 110 outputs which define continuous (i.e., uninterrupted) durations of the video 106 where the target person is predicted to be "speaking" or "not speaking".

In contrast, if the fusion neural network 114 is not implemented as a recurrent neural network and processes audio data 104 and video frames 102 from respective portions of the video independently, then the sequence of speaking classification data 110 outputs generated by the system 100 may be noisy. That is, the sequence of speaking classification data 110 outputs generated by the system 100 may predict extremely rapid transitions (e.g., over periods of 0.1 seconds or less) between "speaking" and "not speaking" predictions for the target person. These rapidly transitioning predictions are not realistic and may degrade the performance of downstream systems using the speaking classification data 110 output by the system 100.

The system 100 includes a training engine 126 which is configured to jointly train the neural networks included in the system 100 (i.e., the audio embedding neural network 116, the image embedding neural network 124, and the fusion neural network 114) by an end-to-end optimization procedure. That is, the neural networks included in the system 100 are jointly trained by backpropagating gradients of a loss function through the fusion neural network 114 and into the audio embedding neural network 116 and the image embedding neural network 124. By jointly training the neural networks included in the system 100 by an end-to-end optimization procedure, the training engine 126 can determine trained neural network parameter values which cause the system 100 to generate more accurate speaking classification data 110 than if the neural networks were trained separately.

The training engine 126 trains the neural networks included in the system 100 based on a set of training data 128. The training data 128 includes multiple training examples 130, where each training example includes: (i) training audio data and training target person images, and (ii) a label indicating target speaking classification data for the training audio data and the training target person images. The training engine 126 iteratively updates the parameter values of the neural networks included in the system 100 to cause them to generate speaking classification data 110 which matches the labels included in the training examples by processing the training audio data and training speaker images. An example process for training the neural networks included in the system 100 is described with reference to FIG. 4.

Figure 2:
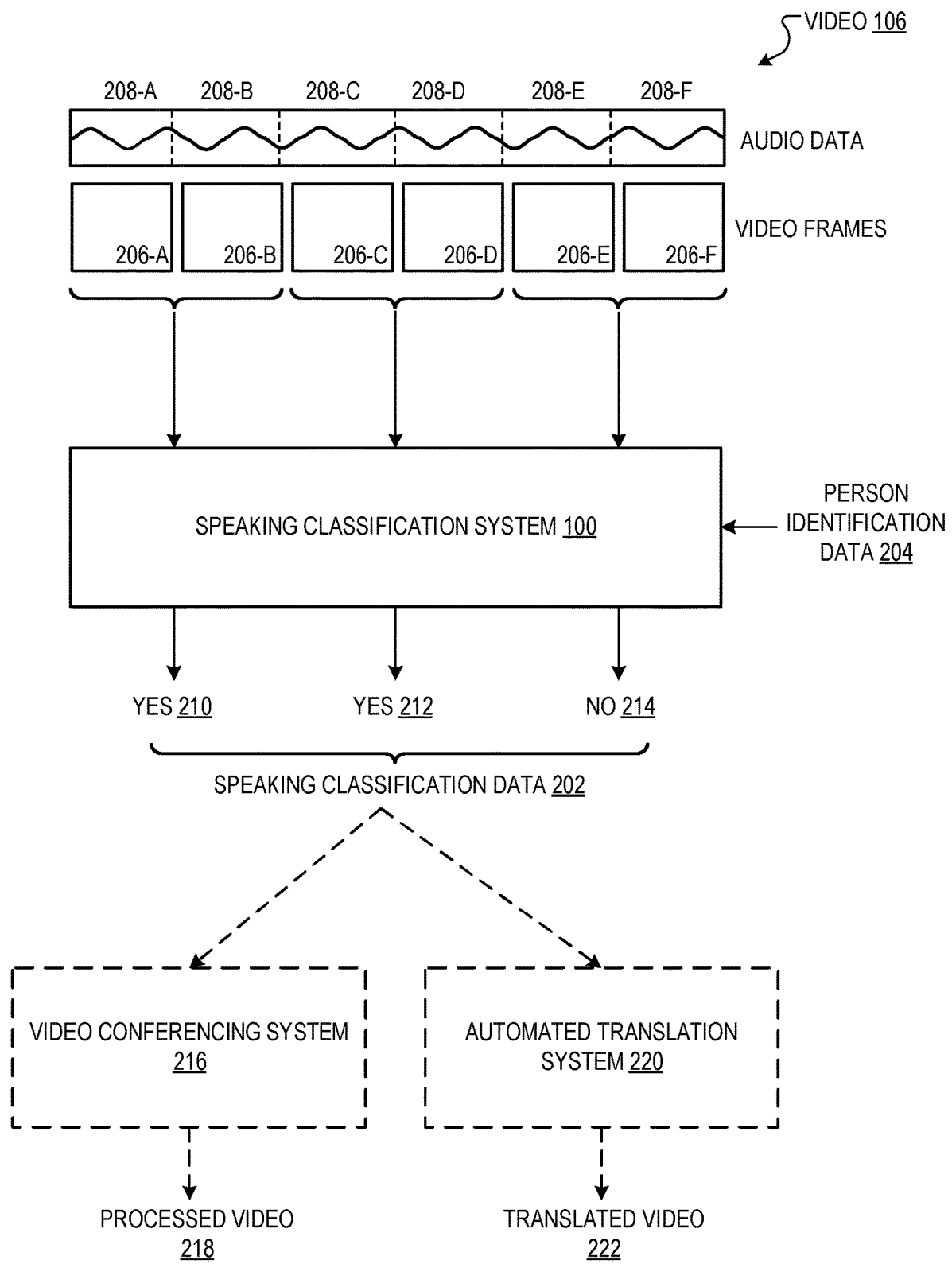
FIG. 2 illustrates an example data flow where a speaking classification system sequentially processes video frames and audio data from respective portions of a video.

FIG. 2 illustrates an example data flow where the speaking classification system 100 sequentially processes video frames and audio data from respective portions of a video 106 to generate a corresponding sequence of speaking classification data 202 outputs. The sequence of speaking classification data 202 outputs define respective predictions for whether a target person specified by the person identification data 204 is speaking during the respective portions of the video 106.

In the example illustrated by FIG. 2, the system 100 processes: (i) video frames 206-A and 206-B, (ii) audio data 208-A and 208-B corresponding to the video frames 206-A and 206-B, and (iii) the person identification data 204, to generate a speaking classification data 210 output. The speaking classification data 210 defines a "Yes" prediction, that is, a prediction that the target person specified by the person identification data 204 is speaking during the portion of the video 106 characterized by video frames 206-A and 206-B and the corresponding audio data 208-A and 208-B. Similarly, the system processes: (i) video frames 206-C and 206-D, (ii) audio data 208-C and 208-D, and (iii) the person identification data 204, to generate the speaking classification data 212. The speaking classification data 212 defines a "Yes" prediction. The system also processes: (i) video frames 206-E and 206-F, (ii) audio data 208-E and 208-F, and (iii) person identification data 204, to generate the speaking classification data 214. The speaking classification data 214 defines a "No" prediction, that is, a prediction that the target person specified by the person identification data 204 is not speaking during the portion of the video 106 characterized by video frames 206-E and 206-F and the corresponding audio data 208-E and 208-F.

For clarity, the example illustrated by FIG. 2 depicts the video frames and corresponding audio data processed by the system 100 to generate the sequence of speaking classification data 202 outputs as being disjoint. For example, the video frames 206-A and 206-B and the audio data 208-A and 208-B processed by the system 100 to generate the speaking classification data 210 do not overlap with the video frames 206-C and 206-D and the audio data 208-C and 208-D processed by the system 100 to generate the speaking classification data 212. In general, the video frames and corresponding audio data processed by the system 100 may characterize overlapping portions of the video 106.

A few examples follow which illustrate how the speaking classification data generated by the speaking classification system 100 can be used by different video processing systems. These examples are intended to be illustrative and should not be construed as limiting the possible applications of speaking classification data generated by the speaking classification system 100.

In one example, speaking classification data generated by the speaking classification system 100 can be provided to a video conferencing system 216. In this example, a video may be generated by a video camera and microphone of the video conferencing system 216 in a conference room with multiple people participating in a video conference. The video may be processed by the speaking classification system 100 in real-time to generate real-time speaking classification data outputs. That is, video frames and audio data generated by the video conferencing system 216 may be provided to the speaking classification system 100 in real-time as they are generated. The speaking classification system 100 may process the provided video to generate respective speaking classification outputs defining predictions for whether each person depicted in the video is currently speaking. The speaking classification data can subsequently be processed by the video conferencing system 216 to generate a processed video 218 to be transmitted to the other participants in the video conference. In a particular example, the video conferencing system 216 may generate the processed video 218 by annotating the video with a bounding box around the face of the current speaker. In another particular example, the video conferencing system 216 may generate the processed video 218 by zooming in on the face of the current speaker in the video.

In another example, the speaking classification data generated by the speaking classification system 100 can be provided to an automated translation system 220. The automated translation system 220 may be configured to process a video to generate a translated video 222. In the translated video 222, the voice of each speaker depicted in the video speaking in a natural language (e.g., English) is replaced by a corresponding voice speaking a translation of the words of the speaker in a different natural language (e.g., French). The speaking classification data generated by the speaking classification system 100 by processing the video can define the portions of the video during which each person depicted in the video is speaking. The audio corresponding to these portions of the video may be transcribed (e.g., by a speech recognition system), translated to a different language (e.g., by a machine translation system), and verbalized (e.g., by a verbalization system) in the different language. The automated translation system 220 may replace the original audio of the video by the translated audio generated in this manner to generate the translated video 222.

Figure 3:
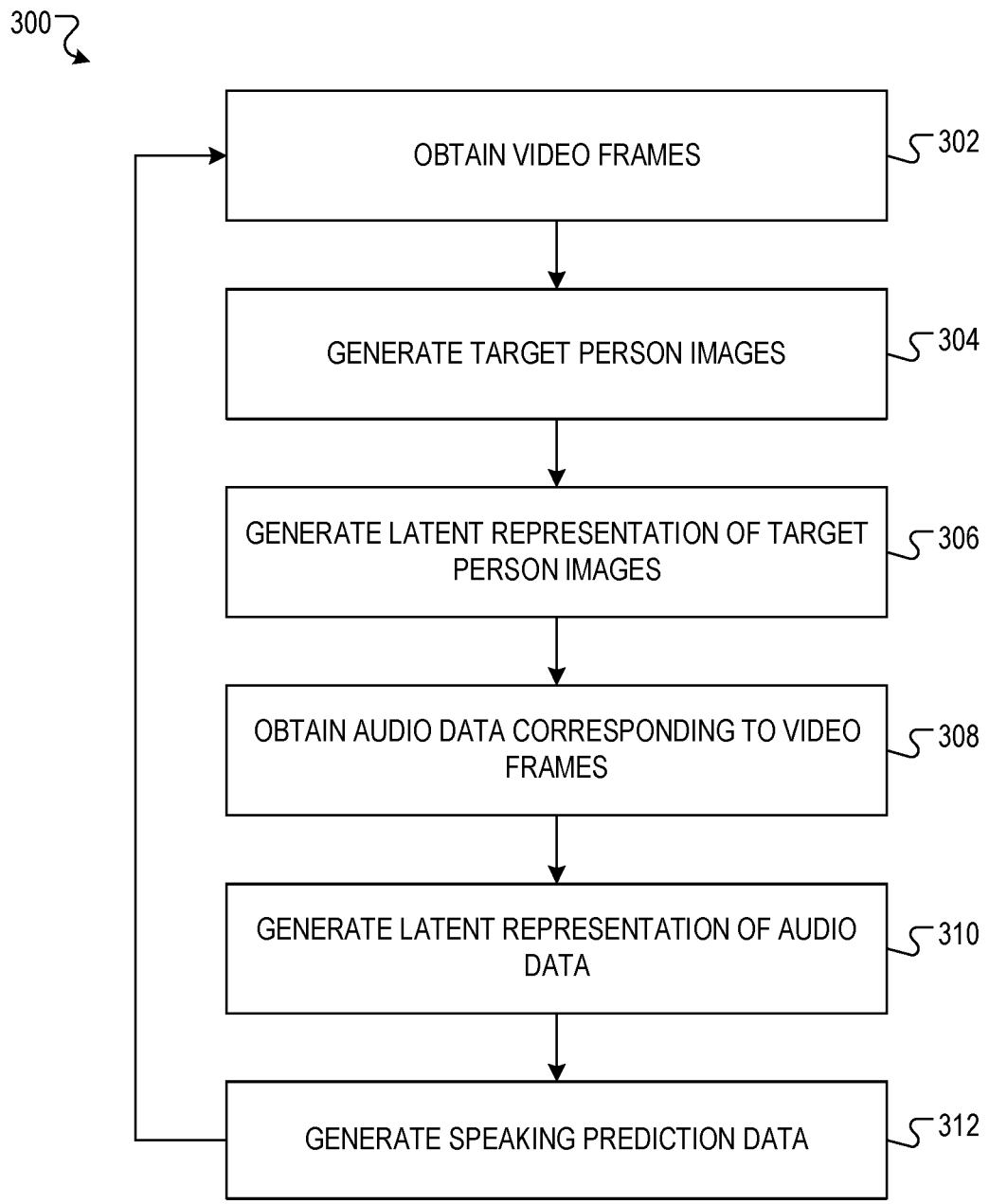
FIG. 3 is a flow diagram of an example process for generating speaking classification data.

FIG. 3 is a flow diagram of an example process 300 for generating speaking classification data. For convenience, the process 300 will be described as being performed by a system of one or more computers located in one or more locations. For example, a speaking classification system, e.g., the speaking classification system 100 of FIG. 1, appropriately programmed in accordance with this specification, can perform the process 300.

The system obtains one or more video frames from a video (302). Generally, the video frames represent only a fraction of the video. For example, the video may include thousands of video frames, while the system may be configured to process only 3 video frames (and audio data corresponding to the 3 video frames) at a time. The video frames may be obtained from a video stored in a data store (e.g., a logical data storage area or physical data storage device), or may be obtained in real-time from a video capture device (e.g., a digital video camera).

The system generates target person images from the video frames (304). To generate the target person images from the video frames, the system receives person identification data which specifies a target person depicted in the video frames. The system determines the position of the target person in the video frames, and crops a portion of each of the video frames which depicts the mouth of the target person to generate the target person images. In some cases, the system crops a portion of each video frame which depicts more than just the mouth of the target person. For example, the system may crop a portion of each video frame which depicts a region of the face of the target person which includes the mouth, the whole face of the target person, or even the whole body of the target person.

The person identification data which specifies the target person can be represented in any appropriate format. For example, the person identification data can be a latent representation of the face of the target person generated using a face embedding neural network (e.g., a FaceNet neural network). In this example, the system may determine the position of the target person in a video frame by using a face detection neural network to detect the position of each face in the video frame. The system can subsequently use the face embedding neural network to generate a respective latent representation of each detected face. The system can determine the detected face with a latent representation that is most similar to the latent representation specified by the person identification data to be the target person. The similarity between latent representations can be determined in accordance with any appropriate similarity metric, e.g., a Euclidean similarity metric or a cosine similarity metric.

The system generates a latent representation of the target person images (306). To generate the latent representation of the target person images, the system can concatenate the target person images and process the concatenated target person images using an image embedding neural network in accordance with current values of image embedding neural network parameters. Alternatively, the system can separately process each of the target person images using the image embedding neural network, and subsequently determine the latent representation of the target person images to be the concatenation of the respective outputs of the image embedding neural network for each of the target images. The system can determine the output of the final layer of the image embedding neural network to be the latent representation of the target person images.

The system obtains audio data from the video which corresponds to the obtained video frames (308). The audio data may correspond to exactly the same portion of the video as the obtained video frames, but can in some cases correspond to a larger or smaller portion of the video than the obtained video frames.

The system generates a latent representation of the obtained audio data (310). To generate the latent representation of the audio data, the system processes the audio data using an audio embedding neural network in accordance with current values of audio embedding neural network parameters. The system determines the output of the final layer of the audio embedding neural network to be the latent representation of the audio data. Optionally, prior to providing the audio data to the audio embedding neural network, the system can process the audio data to generate an alternative representation of the audio data. For example, the system may process a one-dimensional representation of the audio data as an audio waveform to generate an alternative representation of the audio data as a two-dimensional array of mel-frequency cepstral coefficients (MFCCs). After generating the alternative representation of the audio data, the system can generate the latent representation of the audio data by processing the alternative representation of the audio data using the audio embedding neural network.

It should be appreciated that FIG. 3 does not imply that operations 306 and 310 must be performed in any particular order. That is, the latent representation of the images may be generated (306) before, after, or at substantially the same time as the latent representation of the audio data is generated (310).

The system processes the latent representation of the target person images and the latent representation of the audio data using the fusion neural network to generate speaking classification data (312). The speaking classification data defines a prediction (e.g., a numerical probability value between 0 and 1) for whether the target person is speaking during the portion of the video characterized by the obtained video frames and the corresponding audio data. If the fusion neural network is a recurrent neural network (e.g., a GRU), then the system may process the latent representation of the target person images and the latent representation of the audio data to update the current internal state of the recurrent neural network. The system subsequently processes the new internal state of the recurrent neural network to generate the speaking classification data.

After generating the speaking classification data for the portion of the video characterized by the obtained video frames and audio data, the system can return to step 302 and repeat the preceding steps for subsequent portions of the video. Alternatively, if the portion of the video characterized by the obtained video frames and audio data is the last portion of the video, the system may provide the speaking classification data outputs generated for the different portions of the video for use by another system. For example, as described with reference to FIG. 2, the system can provide the generated speaking classification data for use by a video conferencing system or an automated translation system.

Figure 4:
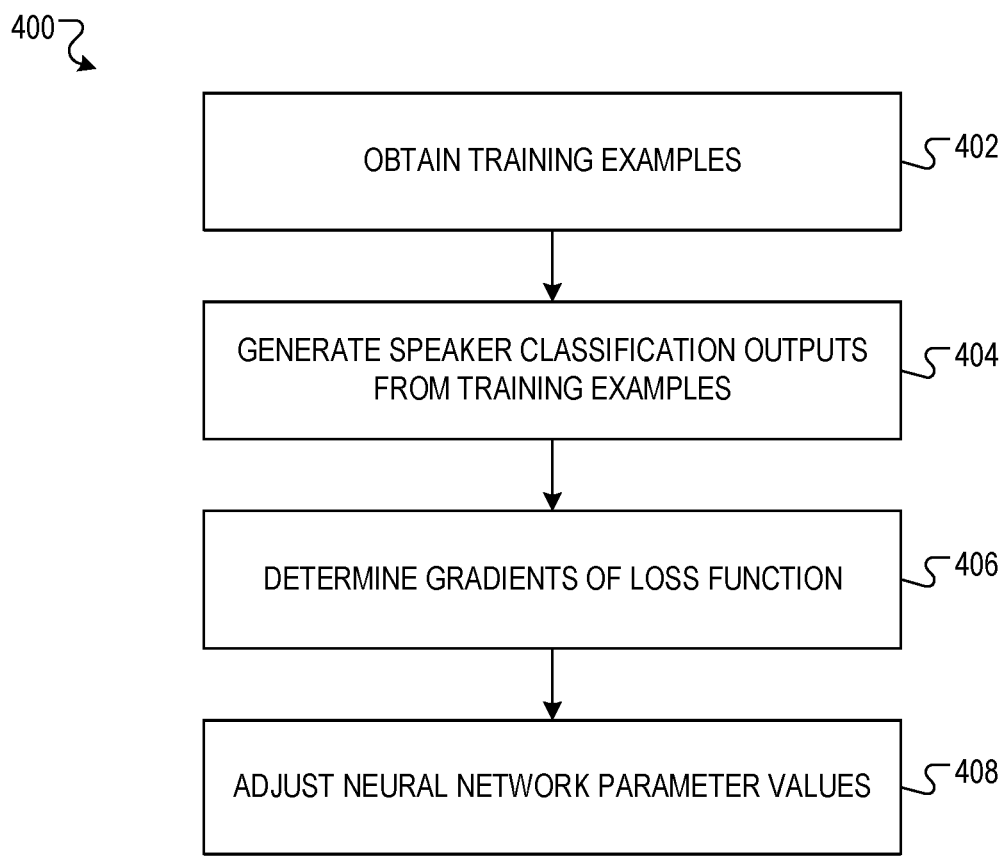
FIG. 4 is a flow diagram of an example process for jointly training an audio embedding neural network, an image embedding neural network, and a fusion neural network by an end-to-end optimization procedure.

FIG. 4 is a flow diagram of an example process 400 for jointly training an audio embedding neural network, an image embedding neural network, and a fusion neural network by an end-to-end optimization procedure. For convenience, the process 400 will be described as being performed by a system of one or more computers located in one or more locations. For example, a speaking classification system, e.g., the speaking classification system 100 of FIG. 1, appropriately programmed in accordance with this specification, can perform the process 400.

The system obtains one or more training examples from a set of training data which includes multiple training examples (402). Each training example includes: (i) training audio data and training target person images, and (ii) a label indicating target speaking classification data for the training audio data and the training target person images. The label may have been manually determined by a human rater. The system may obtain the training examples by randomly sampling from the set of training data.

For each training example, the system processes the training audio data and training target person images included in the training example to generate respective speaking classification data for the training example (404). To generate the speaking classification data for a training example, the system processes the training audio data from the training example using the audio embedding neural network in accordance with current values of audio embedding neural network parameters to generate a latent representation of the training audio data. The system processes the training target person images from the training example using the image embedding neural network in accordance with current values of image embedding neural network parameters to generate a latent representation of the training target person images. Subsequently, the system processes the respective latent representations of the training audio data and the training target person images from the training example using a fusion neural network in accordance with current values of fusion neural network parameters to generate the speaking classification data for the training example.

The system determines gradients of a loss function with respect to the current parameter values of the audio embedding neural network, the image embedding neural network, and the fusion neural network (406). Generally, the loss function compares the speaking classification data generated for each training example to the label indicating the target speaking classification data. For example, the loss function may be a binary cross-entropy loss function. Optionally, the loss function can include a regularization term (e.g., an $L_2$ penalty on the weights of the neural networks). The system can determine the gradients using a backpropagation procedure.

In some cases, the system processes the training examples to generate auxiliary speaking classification data outputs which are generated based on the training target person images alone (i.e., without relying on the training audio data). In these cases, the loss function can include additional terms which compare the speaking classification data generated for each training example based on the training target person images alone to the target speaking classification data.

The system adjusts the current parameter values of the audio embedding neural network, the image embedding neural network, and the fusion neural network using the determined gradients (408). In general, the system can adjust the current parameter values of the neural networks using the gradients of the loss function based on the update rule from any appropriate gradient descent optimization algorithm, for example, Adam, RMSprop, Adagrad, Adadelta, and AdaMax, amongst others.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining one or more images which each depict a mouth of a given person at a respective time point, wherein each of the respective time points are different;
   processing the one or more images using an image embedding neural network to generate a latent representation of the one or more images;
   obtaining audio data corresponding to the one or more images;
   processing a representation of the audio data using an audio embedding neural network to generate a latent representation of the audio data; and
   processing the latent representation of the one or more images and the latent representation of the audio data using a recurrent neural network to generate an output defining a prediction for whether the given person is speaking at one or more of the respective time points;
   wherein the image embedding neural network, the audio embedding neural network, and the recurrent neural network are trained by an end-to-end optimization procedure.

2. The method of claim 1, wherein obtaining one or more images which each depict a mouth of a given person at a respective time point comprises:
   obtaining one or more video frames from a video, wherein each of the video frames depicts the given person;
   determining a respective location of the given person in each of the one or more video frames; and
   for each of the one or more video frames, cropping a respective portion of the video frame which depicts the mouth of the given person based on location of the given person in the video frame.

3. The method of claim 2, wherein obtaining audio data corresponding to the one or more images comprises:
   obtaining audio data corresponding to the one or more video frames of the video.

4. The method of claim 1, wherein each of the one or more images depict a face or body of the given person in addition to the mouth of the given person.

5. The method of claim 1, wherein the representation of the audio data comprises mel-frequency cepstral coefficients of the audio data.

6. The method of claim 1, wherein processing the latent representation of the one or more images and the latent representation of the audio data using a recurrent neural network to generate an output defining a prediction for whether the given person is speaking at one or more of the respective time points comprises:

processing the latent representation of the one or more images and the latent representation of the audio data to update a current internal state of the recurrent neural network to generate a new internal state of the recurrent neural network; and processing the new internal state of the recurrent neural network to generate the output defining the prediction for whether the given person is speaking at one or more of the respective time points.

7. The method of claim 1, wherein the image embedding neural network and the audio embedding neural network each comprise one or more convolutional neural network layers.

8. The method of claim 1, wherein the recurrent neural network comprises a plurality of gated recurrent units (GRUs).

9. A system, comprising:
a data processing apparatus;
a memory in data communication with the data processing apparatus and storing instructions that cause the data processing apparatus to perform operations comprising:
obtaining one or more images which each depict a mouth of a given person at a respective time point, wherein each of the respective time points are different;
processing the one or more images using an image embedding neural network to generate a latent representation of the one or more images;
obtaining audio data corresponding to the one or more images;
processing a representation of the audio data using an audio embedding neural network to generate a latent representation of the audio data; and
processing the latent representation of the one or more images and the latent representation of the audio data using a recurrent neural network to generate an output defining a prediction for whether the given person is speaking at one or more of the respective time points;
wherein the image embedding neural network, the audio embedding neural network, and the recurrent neural network are trained by an end-to-end optimization procedure.

10. The system of claim 9, wherein obtaining one or more images which each depict a mouth of a given person at a respective time point comprises:
obtaining one or more video frames from a video, wherein each of the video frames depicts the given person;
determining a respective location of the given person in each of the one or more video frames; and
for each of the one or more video frames, cropping a respective portion of the video frame which depicts the mouth of the given person based on location of the given person in the video frame.

11. The system of claim 10, wherein obtaining audio data corresponding to the one or more images comprises:
obtaining audio data corresponding to the one or more video frames of the video.

12. The system of claim 9, wherein each of the one or more images depict a face or body of the given person in addition to the mouth of the given person.

13. The system of claim 9, wherein the representation of the audio data comprises mel-frequency cepstral coefficients of the audio data.

14. The system of claim 9, wherein processing the latent representation of the one or more images and the latent representation of the audio data using a recurrent neural network to generate an output defining a prediction for whether the given person is speaking at one or more of the respective time points comprises:
processing the latent representation of the one or more images and the latent representation of the audio data to update a current internal state of the recurrent neural network to generate a new internal state of the recurrent neural network; and
processing the new internal state of the recurrent neural network to generate the output defining the prediction for whether the given person is speaking at one or more of the respective time points.

15. The system of claim 9, wherein the image embedding neural network and the audio embedding neural network each comprise one or more convolutional neural network layers.

16. The system of claim 9, wherein the recurrent neural network comprises a plurality of gated recurrent units (GRUs).

17. One or more non-transitory computer storage media storing instructions that when executed by one or more computers cause the one or more computers to perform operations comprising:
obtaining one or more images which each depict a mouth of a given person at a respective time point, wherein each of the respective time points are different;
processing the one or more images using an image embedding neural network to generate a latent representation of the one or more images;
obtaining audio data corresponding to the one or more images;
processing a representation of the audio data using an audio embedding neural network to generate a latent representation of the audio data; and
processing the latent representation of the one or more images and the latent representation of the audio data using a recurrent neural network to generate an output defining a prediction for whether the given person is speaking at one or more of the respective time points;
wherein the image embedding neural network, the audio embedding neural network, and the recurrent neural network are trained by an end-to-end optimization procedure.

18. The non-transitory computer storage media of claim 17, wherein obtaining one or more images which each depict a mouth of a given person at a respective time point comprises:
obtaining one or more video frames from a video, wherein each of the video frames depicts the given person;
determining a respective location of the given person in each of the one or more video frames; and
for each of the one or more video frames, cropping a respective portion of the video frame which depicts the mouth of the given person based on location of the given person in the video frame.

19. The non-transitory computer storage media of claim 18, wherein obtaining audio data corresponding to the one or more images comprises:
obtaining audio data corresponding to the one or more video frames of the video.

20. The non-transitory computer storage media of claim 17, wherein each of the one or more images depict a face or body of the given person in addition to the mouth of the given person.

* * * * *